United States Patent [19]

Nakanishi et al.

[11] Patent Number: 4,698,224

[45] Date of Patent: Oct. 6, 1987

[54] PRODUCTION OF ALCOHOLIC BEVERAGES

[75] Inventors: Koichi Nakanishi; Toshio Onaka; Takashi Inoue, all of Takasaki, Japan

[73] Assignee: Kirin Beer Kabushiki Kaisha, Tokyo, Japan

[21] Appl. No.: 719,494

[22] Filed: Apr. 4, 1985

[30] Foreign Application Priority Data

| Apr. 10, 1984 | [JP] | Japan | 59-71585 |
| Aug. 31, 1984 | [JP] | Japan | 59-182301 |
| Sep. 14, 1984 | [JP] | Japan | 59-193378 |

[51] Int. Cl.$^4$ ............................................. C12C 11/00
[52] U.S. Cl. ......................................... 426/11; 426/15; 426/16; 435/161; 435/162; 435/801
[58] Field of Search ................. 426/11, 15, 16, 493, 426/494; 435/161, 162, 801

[56] References Cited

U.S. PATENT DOCUMENTS

| 2,967,107 | 1/1961 | Geiger et al. | 426/16 |
| 3,201,328 | 8/1965 | Williams | 426/16 |
| 3,207,606 | 9/1965 | Williams | 426/16 |
| 3,234,026 | 2/1966 | Coutts | 426/16 |
| 3,345,179 | 10/1967 | Pollack et al. | 426/16 |
| 3,396,031 | 8/1968 | Parsons et al. | 426/16 |
| 3,437,490 | 4/1969 | Schaus et al. | 426/16 |
| 3,563,759 | 2/1971 | Wolter et al. | 426/16 |
| 3,627,544 | 12/1971 | Rosewitz et al. | 426/16 |
| 4,021,579 | 5/1977 | Barrett | 425/15 |

FOREIGN PATENT DOCUMENTS

| C281558 | 1/1913 | Fed. Rep. of Germany . |
| 2146201 | 3/1973 | Fed. Rep. of Germany . |
| C51849 | 11/1889 | Netherlands . |
| 274225 | 7/1927 | United Kingdom . |

OTHER PUBLICATIONS

C.A., vol. 81 & 3, Abs #11803n.
C.A., vol 96, #9, Abs. #67230a.
Rapid Beer Production and Conditioning . . . , Journal of the Institute of Brewing, 79:487, (1973).

Primary Examiner—R. B. Penland
Attorney, Agent, or Firm—Ladas & Parry

[57] ABSTRACT

Disclosed is a modification of production of alcoholic beverages such as beer or wine by subjecting to fermentation by means of a facultative anaerobic microorganism such as a yeast a substrate liquor to the microorganism, which modification comprises conducting at least a part of the fermentation under such an anaerobic condition that the content of the dissolved oxygen in the substrate liquor is held at a restricted level thereby to reduce the content of diacetyls which imparts a disagreeable odor to the alcoholic beverages produced. The anaerobic fermentation makes it possible to use a yeast in high concentration without entailing the increase in the quantity of the diacetyls. Typically, the fermentation is conducted in two zones; one zone being conducted under the conditions that the yeast is proliferating while the other under the conditions that the yeast is not proliferating.

14 Claims, No Drawings

PRODUCTION OF ALCOHOLIC BEVERAGES

BACKGROUND OF THE INVENTION

1. Field of the Art

This invention relates to rapid production of alcoholic beverages such as, for example, beer and wine. More particularly, the present invention pertains to rapid process for production of alcoholic beverages with low concentration of diacetyls.

The production steps of alcoholic beverages generally consist essentially of the earlier stage of fermentation wherein fermentation proceeds with proliferation of yeast in the starting brew liquor in which yeast is added, and, subsequent thereto, the later stage of fermentation wherein fermentation proceeds without proliferation of yeast. In the earlier stage of fermentation, simultaneously with progress of consumption by the yeast of both nitrogen and carbon which are substrates for the yeast, diacetyls (in the present invention, the term "diacetyls" refers to comprehensively vicinal diketones such as diacetyl, pentanedione, etc. and acetohydroxyacids which are precursors thereto, such as acetolactic acid, acetohydroxybutyric acid, etc.) of which by-production should be avoided will inevitably be formed. On the other hand, consumption of the carbon takes place mainly in the later stage of fermentation, and the later stage is also the step of making diacetyls formed in the earlier stage of fermentation disappear.

The diacetyls which have come to exist in the fermented liquor in the earlier state of fermentation are mostly vicinal diketone precursors, which cannot be decomposed as such by the microorganism employed, namely yeast, but they can be decomposed for the first time when they are converted to vicinal diketones. However, since the reaction in which a vicinal diketone precursor is converted into a vicinal diketone is a non-biological and purely chemical reaction, and the velocity of this chemical reaction is slow, because the later stage of fermentation is conducted at relatively lower temperature, and the reaction stands as a velocity controlling factor, whereby a long time is necessary for production of alcoholic beverages having a low concentration of diacetyls.

2. Prior Art

For shortening of brewing time and lowering of concentration of diacetyls, various proposals have heretofore been made in the art.

For example, as a means for producing rapidly alcoholic beverages, it was proposed to increase the concentration of yeast which serves to effect fermentation [J. Inst. Brew., 72, 193 (1966); and ibid, 75, 260 (1969)]. However, the fermented liquor in that case has high diacetyl concentration, whereby aging for a long time is stated to be required [Amer. Soc. Brew. Chem. Proc., 36, 9 (1978)].

Meanwhile, the techniques for immobilizing yeast in hydrogels have been advanced, and a brewing method employing such immobilized yeast has been proposed [J. Inst. Brew., 84, 228 (1978), EBC Congress Proc., 505 (1981) and Brauwissenschaft, 35, 254 (1982)]. This method, which can employ yeast at a high concentration, enables shortening of the brewing period as an advantage of the above high concentration method, and therefore expected to be promising as a brewing technique in the future. However, this method cannot be free from the problem inherent in the high yeast concentration method, namely high concentration of diacetyls in the fermented liquor formed, and therefore its application has not yet come to practice because of a long time of aging required.

Alcoholic beverages having a high concentration of diacetyls have disagreeable odor called "diacetyl odor". The diacetyl odor has a threshold value for organoleptic perception so low as 0.1 to 0.2 mg/liter and has thus been hated by brewers as impurities which impair flavor of alcoholic beverages.

In view of this, various methods have heretofore been proposed to reduce the quantity of once-formed diacetyls such as, for example, subjecting the alcoholic beverage produced to post fermentation. In addition, methods for suppressing formation of diacetyls have also been proposed, such as conducting fermentation step under aeration, at an elevated temperature or at a low pH as shown in, for example, THE BREWER, December 1974, pp 638-643.

These methods, however, are not satisfactory because the alcoholic beverages so produced are not fully acceptable due to their poor flavor, and it has thus been resorted to to carry out the later stage of fermentation in a long period of time so as to cause the diacetyls to disappear although such a long fermentation is disadvantageous.

An attempt to reduce diacetyls in the fermented liquor obtained by the immobilized yeast method by heating has also been reported (J. Inst. Brew., 79, 487, 1973). The fermentation within a bed of immobilized yeast should suffer from another problem such that, since consumption by the yeast used of α-amino nitrogen in a fermentation liquor does not fully take place, the fermented liquor obtained has a high concentration of α-amino nitrogen or has a low concentration of flavor components produced as a result of consumption of α-amino nitrogen.

SUMMARY OF THE INVENTION

An object of the present invention is to produce alcoholic beverages with low diacetyl concentration within a short period of time thereby to overcome the drawbacks as mentioned above, this object being intended to be accomplished by practicing the fermentation step under the condition of a low content of the dissolved oxygen. Practice of the fermentation step under the condition of low concentration of the dissolved oxygen means carrying out of consumption by yeast mainly of carbon among the substrates.

Another object of the present invention is to produce alcoholic beverages with a low diacetyl concentration as well as a high concentration of flavor ingredients within a short period of time, this object being intended to be accomplished by practicing fermentation in two steps, one step under the condition of a low concentration of the dissolved oxygen referred to hereinabove, and the other step under the condition of permitting nitrogen of the substrates to be consumed by the yeast employed.

In the first aspect of the present invention, alcoholic beverages with low diacetyl concentration is produced within a short period of time without entailing the drawbacks as mentioned above, by practicing the fermentation step under the condition of low dissolved oxygen content.

Accordingly, the process for producing alcoholic beverages according to the present invention (I) in its first aspect comprises permitting a facultative anaerobic microorganism to act on its substrate to effect fermentation, said fermentation being practiced under the condition of a concentration of the dissolved oxygen of 0.5 ppm or lower in the substrate-containing starting fermentation liquor (or brew liquor as an alternative) preferably over the whole period of fermentation.

In the first aspect, the present invention (I) has succeeded in production of alcoholic beverages with low diacetyl concentration by practicing fermentation of a facultative anaerobic microorganism under anaerobic conditions. A specific embodiment of the present invention is a process for brewing beer or wine according to the high concentration yeast method (e.g. by use of immobilized yeast) from malt wort or fruit juice. According to this process, in spite of the fact that it is a high concentration process in which the amount of diacetyl produced is to be inherently increased in the prior art, the diacetyl concentration in the fermented liquor produced is ordinarily 1.0 ppm or less, particularly 0.4 ppm or less. Therefore, according to the present invention (I), the greatest factor which has heretofore necessitated the long post-treatment step for reducing diacetyl content by performing post-fermentation of the fermented liquor formed can be eliminated, whereby the time for producing alcoholic beverages can be shortened to a great extent without impairing flavor thereof.

As described above, it has been proposed to perform fermentation under aeration in order to inhibit formation of diacetyls. In view of such a situation as taught by the prior art technique, inhibition of diacetyl formation enabled by carrying out fermentation under anaerobic conditions should be unexpected.

In the second aspect of the present invention, a solution is given to the above problem, namely alcoholic beverages with low concentration of diacetyls in which consumption of the $\alpha$-amino nitrogen is controlled at will, by practicing fermentation in two divided fermentation zones and practicing each fermentation so that the diacetyls concentration will not exceed an acceptable level even with a short period of fermentation.

Accordingly, the process for producing alcoholic beverages according to the present invention (IIA) comprises subjecting a starting fermentation liquor (or brew liquor as an alternative) to a first fermentation, in a first fermentation zone, during which substantial proliferation of a yeast takes place, and subsequently to a second fermentation, in a second fermentation zone, to which substantially no yeast used in the first fermentation is entrained and during which fermentation is conducted under such conditions that substantially no proliferation of a yeast takes place, the first fermentation being practiced in the presence of a yeast at a concentration less than 0.4% based on the starting brew liquor and the second fermentation being practiced in the presence of a yeast at a concentration not less than 0.4% based on the starting brew liquor.

The other process for producing alcoholic beverages in the second aspect of the present invention (IIB) comprises subjecting a starting brew liquor to a first fermentation, in a first fermentation zone, during which substantial proliferation of a yeast takes place, and subsequently to a second fermentation in a second fermentation zone, during which no substantial proliferation of a yeast takes place, the fermented liquor obtained from the first fermentation being heated before it is subjected to the second fermentation.

In either one of the inventions IIA and IIB, the fermentation step to produce alcoholic beverages is conducted in two steps, namely the fermentation with substantial proliferation of yeast taking place (the first fermentation) and the fermentation with no substantial proliferation of yeast taking place (the second fermentation), and the difference between the processes IIA and IIB resides in the means for lowering the diacetyls content in practicing this fermentation system and the means for shortening the fermentation time as related to said means for lowering the diacetyls content. More specifically, based on the fact that the fermentation with substantially no proliferation of yeast, which is comprised commonly in each of the present inventions IIA and IIB as the second fermentation, is carried out under such anaerobic conditions and/or low temperature conditions that no formation of diacetyls inherently takes place, the substrate solution to be subjected to the second fermentation is so selected that it is a substrate solution with small total content of diacetyls in the invention IIA, that is, the first fermentation is practiced at a low yeast concentration, while, in the invention IIB, it is a substrate solution in which diacetyls are in the form of readily decomposable vicinal diketones, that is, after the first fermentation, the liquor formed is heated. And, shortening of the time for production of alcoholic beverages is accomplished by, in the invention IIA, practicing the second fermentation at a high yeast concentration; and by, in the invention IIB, practicing the process in which the vicinal diketone precursor is converted into a vicinal diketone under heating, and further, in some embodiments of the invention IIB, by practicing the first or the second fermentations at high yeast concentrations.

The invention (IIA) may be regarded as an improvement to the high yeast concentration fermentation method, but it has eliminated the problem that the increase in diacetyls inherent in the above high yeast concentration fermentation method by practicing fermentation of the high yeast concentration only in fermentation of the yeast under unproliferated state, the second fermentation. Also, the problem of decreased consumption of $\alpha$-amino nitrogen has been overcome by appropriately selecting the fermentation time, temperature, degree of aeration and stirring intensity during the first fermentation, whereby the $\alpha$-amino nitrogen in the fermented liquor can be controlled at will. Accordingly, the problem of the diacetyls concentration and the problem of $\alpha$-amino nitrogen consumption, each of which has not heretofore been overcome in the conventional high yeast concentration fermentation method, have easily been overcome at the same time.

On the other hand, the invention IIB may be regarded as an improvement to the method wherein conversion of a vicinal diketone precursor into a vicinal diketone is accelerated by heating. The invention IIB is, however, such that the second fermentation is conducted under the condition with no substantial proliferation of yeast, and accordingly, even when the second fermentation may be practiced in the mode of the high yeast concentration fermentation method, not only the vicinal diketone precursor is formed at the fermentation but also the vicinal diketone formed from the precursor by said heating will disappear as the result of the second fermentation until the concentration is substantially zero. As the result, no additional aging step after the second fermentation is necessary if the aging is for decomposition of diacetyls.

Also, similarly as in the invention IIA, the α-amino nitrogen in the fermented liquor can be controlled at will, as a matter of course.

In the third aspect of the present invention, another solution is given to overcome the above problem, namely to obtain alcoholic beverages with low concentration of diacetyls in which consumption of α-amino nitrogen is controlled at will, by practicing fermentation in two divided fermentation zones and practicing each fermentation so that the diacetyls concentration will not exceed an acceptable level even with a short period of fermentation.

Accordingly, the process for producing alcoholic beverages according to the present invention (IIIA) comprises subjecting a starting brew liquor to a first fermentation in a first fermentation zone, during which no substantial proliferation of a yeast takes place, and subsequently to a second fermentation, in a second fermentation zone, during which substantial proliferation of a yeast takes place, said first fermentation being practiced in the presence of a yeast immobilized in a hydrogel at a concentration not less than 0.4% based on the starting brew liquor and also at a temperature of 4° C. or less and/or under anaerobic conditions, and said second fermentation being practiced in the presence of a yeast at a concentration less than 0.4% based on the starting brew liquor.

Still another process for producing alcoholic beverages in the third aspect of the present invention (IIIB) comprises subjecting a starting brew liquor to a first fermentation in a first fermentation zone, and subsequently to a second fermentation, in a second fermentation zone, during which substantial proliferation of a yeast takes place in the second fermentation zone, said first fermentation being practiced in the presence of an immobilized yeast at a concentration not less than 0.4% based on the starting brew liquor and the fermented liquor obtained from the first fermentation being heated prior to being subjected to the second fermentation, and said second fermentation being practiced in the presence of a yeast at a concentration less than 0.4% based on the starting brew liquor.

Each of the inventions IIIA and IIIB comprises practicing the fermentation in two steps, namely the fermentation with an immobilized yeast of high concentration of 0.4% or higher (the first fermentation) and the fermentation during which substantial proliferation of yeast takes place (the second fermentation), and practicing the second fermentation in the presence of a yeast at a concentration of less than 0.4% based on the starting brew liquor, and difference between the processes IIIA and IIIB resides in the means for lowering the diacetyls in practicing this fermentation system and the means for shortening the fermentation time as related to said means for lowering the diacetyls. More specifically, as the substrate solution to be subjected to the second fermentation, a substrate solution with small total content of diacetyls is prepared in the invention IIIA (that is, the first fermentation is practiced at a low temperature or an anaerobic condition), while, in the invention IIIB, a substrate solution in which diacetyls are in the form of decomposable vicinal diketones is prepared (that is, after the first fermentation, the liquor formed is heated).

Each of the inventions IIIA and IIIB may be regarded as an improvement to the fermentation process with an immobilized yeast in a high concentration, but the invention IIIA has eliminated the problem that the increase in diacetyls inherent in the above high yeast concentration fermentation method by practicing fermentation with high concentration immobilized yeast under a low temperature or anaerobic condition. Also, the problem of decreased consumption of α-amino nitrogen has been overcome by selecting appropriately the fermentation time, temperature, degree of aeration and stirring intensity during the second fermentation, whereby the α-amino nitrogen in the fermented liquor can be controlled at will. Accordingly, the problem of the diacetyl concentration and the problem of α-amino nitrogen consumption, each of which has not heretofore been overcome in the high yeast concentration fermentation method, have easily been overcome at the same time.

On the other hand, the invention IIIB may be regarded as an improvement to the method wherein conversion of a vicinal diketone precursor into a vicinal diketone is accelerated by heating. However, in the invention IIIB, since the first fermentation is conducted according to the fermentation method with a high concentration immobilized yeast, even if a vicinal diketone precursor may be formed at a high percentage, the vicinal diketone formed from the precursor thereof by heating after said fermentation will disappear as the result of the second fermentation. Accordingly, the problem of increased diacetyl concentration inherent in the fermentation method with the use of a high concentration immobilized yeast has been overcome. Also, similarly as in the invention IIIA, α-amino nitrogen in the fermented liquor in the second fermentation can be controlled at will, as a matter of course.

It is to be understood that, in description of the present invention, the inventions I, IIA, IIB, IIIA and IIIB, and "proliferation" are interchangeably called the embodiments I, IIA, IIB, IIIA and IIIB of the present invention, and "growth", respectively.

DETAILED DESCRIPTION OF THE INVENTION

Production of Alcoholic Beverages (I)

Starting fermentation liquor, microorganism and fermentation:

Except for carrying out fermentation with a facultative anaerobic microorganism under anaerobic conditions, the starting fermentation liquor, the microorganisms for fermentation and the fermentation steps are essentially the same as those in the prior art. The expression "starting fermentation liquor" is used herein in respect of the inventions I, IIA, IIB, IIIA and IIIB interchangeably with "starting brew liquor".

The starting fermentation liquor contains a substrate for a microorganism to be used, and it is generally a solution or a dispersion containing a sugar as the substrate. A typical example of such a starting fermentation liquor may be malt wort, fruit juice, etc.

The microorganism which produces a product such as alcohol through metabolism of such substrates is also known, as exemplified by yeast (e.g. *Saccharomyces uvarum, Saccharomyces cerevisiae*, etc.). These microorganisms are generally facultative anaerobes, and the present invention I, which is fundamentally based on fermentation under anaerobic conditions, contemplates facultative anaerobic microorganisms as useful microorganisms.

The effect of inhibiting diacetyl formation of the present invention I is particularly marked in practicing fermentation by the use of a microorganism in a high concentration. Specifically, for example, in the case when the microorganism is a yeast, the yeast concentration is 0.4 W/V % or higher (W: in grams, V: in milliliters) as calculated on dry yeast based on the starting fermentation liquor (see the specific definition of concentration as shown below).

The yeast in such a high concentration yeast method can be also in the form of an immobilized yeast, in addition to the so called slurry yeast. As mentioned above, an immobilized yeast is preferred in the sense that it can be used in a mode similar to a non-biological catalyst.

Immobilized yeast is already known, and details thereof are described in various textbooks or reviews, for example, "Enzymatic Engineering" (Tokyo Kagaku Dojin), edited by Saburo Fukui, Ichiro Chibata and Shuichi Suzuki; David Williams, Douglas M. Munnecke: Biotech. and Bioeng. 23, 1813–25 (1981).

Fermentation by the use of an immobilized yeast may be carried out by, for example, a method in which a starting fermentation liquor is brought into contact with beads of immobilized yeast in the form of a fixed-bed or an unfixed or fluidized bed. In view of the characteristic enzymatic reaction in which the reaction will proceed under mild conditions, it is preferred to pass a starting fermentation liquor (once or plural times) through a fixed-bed of immobilized yeast beads. This method is also known as the method by the so called bioreactor, as disclosed in the above references.

The present invention I is particularly advantageous in practicing the high concentration yeast method, as mentioned above, and the yeast concentration (W/V %) is, in the case of passing a starting fermentation liquor through the fixed-bed of immobilized yeast beads as mentioned above as the V which is the volume (ml) of the reaction vessel filled with the immobilized yeast beads; and the W which is the weight of the yeast contained in immobilized yeast beads filling the reactor as calculated on dry yeast (g).

According to the present invention I, fermentation is practiced preferably over its whole period under the condition of the dissolved oxygen concentration of 0.5 ppm or lower, preferably 0.1 ppm or lower. This means typically that fermentation of the starting fermentation liquor after deoxygenation is initiated with addition of a microorganism, and fermentation is carried out with oxygen prevented to come into the fermentation zone from outside until completion of fermentation.

Removal of dissolved oxygen:

Removal of dissolved oxygen, which is hereinbelow referred to as deoxygenation, in the starting fermentation liquor may be carried out according to any desired method suitable for the purpose. As mentioned above, deoxygenation is typically carried out before initiation of fermentation.

A specific example of deoxygenation method is to apply a reduced pressure on the starting fermentation material. Simultaneously with or after application of reduced pressure, an inert gas such as carbon dioxide, nitrogen or others (particularly carbon dioxide gas) may be blown into the starting fermentation liquor to effect deoxygenation more effectively.

Another example of deoxygenation method is to permit a facultative anaerobic microorganism to respire in the starting fermentation liquor resulting in absorption of dissolved oxygen. Specifically, for example, it is a method in which an appropriate amount of yeast is added to the liquor so as to have the dissolved oxygen absorbed thereby through its respiring action. The yeast in this case may also be an immobilized one. According to this deoxygenation method, the oxygen at the substrate level in the substrate-containing starting fermentation liquor, viz. substances, among the substrate molecules, which act oxidatively on other substances similarly as molecular oxygen, can also be absorbed by the yeast at the same time as dissolved oxygen in molecular state, the deoxygenation effect is greater than the physicochemical deoxygenation method as mentioned above.

The two deoxygenation methods shown above are compatible, as a matter of course. Therefore, it is possible to employ both methods in combination, if desired.

The concentration of the dissolved oxygen in the starting fermentation liquor was determined for the liquid phase of the starting fermentation liquor by a D.O. meter with commercially available oxygen electrodes used.

The term "fermentation" as used herein in terms of the invention I does not include the deoxygenation step in which dissolved oxygen in the substrate-containing starting fermentation liquor is absorbed by respiration of a facultative anaerobic microorganism.

Production of Alcoholic Beverages (II)

Basic fermentation step:

The method of the present invention (II) comprises subjecting a starting brew liquor to a first fermentation, during which substantial proliferation of yeast takes place, in a first fermentation zone (specifically a fermentation tank) and subsequently to a second fermentation, during which no substantial proliferation of yeast takes place, in a second fermentation zone (specifically a fermentation tank).

The starting brew liquor contains substrates for a yeast to be used, and it is generally a solution or a dispersion containing a sugar as the substrate. A typical example of such a starting brew liquor is malt wort, fruit juice, etc.

The yeast which produces products such as alcohol through metabolism of such substrates is also known, as exemplified by *Saccharomyces uvarum*, *Saccharomyces cerevisiae*, etc. These yeasts are generally facultative anaerobes.

The first fermentation and the second fermentation may be practiced by use of the same species of yeast or different species of yeast.

The yeast may be free one like the so called slurry yeast, but it is particularly preferred to employ an immobilized yeast in order to carry out a high yeast concentration fermentation of the second fermentation, above all the second fermentation in the invention IIA.

As mentioned above, it is known to use an immobilized yeast carried on or occluded in a hydrogel, and details of itself and use thereof are described in various textbooks and reviews as mentioned above.

The fermentation conditions and others are not essentially different from those known in the prior art except for necessary changes in practicing the present invention II.

The first fermentation during which substantial proliferation of yeast takes place refers to a fermentation wherein the α-amino nitrogen is consumed to a desired level as intended with the proliferation of yeast. Accordingly, the first fermentation is carried out generally under aerating condition. However, if the starting brew liquor is aerated prior to feeding to the fermentation zone or the fermentation tank, aeration in said zone or tank is not necessary. After completion of the first fermentation, the dissolved oxygen (DO) will ordinarily become 0.5 ppm or less. Also, consumption of the α-amino nitrogen will ordinarily be effected to the exent realized in the fermentation at the yeast concentration conventionally practiced.

The second fermentation during which no substantial proliferation of yeast takes place refers to a fermentation such that the concentration of diacetyls formed with proliferation of yeast is 0.1 ppm or less. Accordingly, the second fermentation is carried out generally under anaerobic conditions (preferably with DO of 0.5 ppm or less, more preferably 0.1 ppm or less) and/or under low temperature conditions of 4° C. or lower, preferably −1° to +1° C. At a temperature of 4° C. or lower, proliferation of yeast does not substantially proceed even under non-anaerobic conditions.

The first fermentation and the second fermentation are carried out in respective fermentation zones. Specifically, and typically, fermentation is carried out separately by use of respective fermentation tanks. Each fermentation tank may be any desired one suited for the purpose, as clearly seen from the above description. One or both of the fermentations may be carried out by use of a plurality of tanks connected in parallel or in series to each other. Also, if desired, provided that the both fermentation steps are practiced separately from each other, both fermentation steps can be carried out in a single or the same fermentation tank.

In the embodiment IIA, when the yeast used in the first fermentation is brought into the second fermentation, diacetyls may sometimes be formed in the second fermentation. Accordingly, the fermented liquor obtained in the first fermentation is required to be subjected to yeast separation by means of centrifugation, etc. before practicing the second fermentation. Also, in the embodiment IIB, when yeast is brought into the heating step, the fermented liquor can have an objectionable odor formed by heating yeast, and yeast separation by means of centrifugation, etc. should preferably be performed. When the second fermentation is to be carried out anaerobically, the yeast removal before the second fermentation should preferably be carried out anaerobically.

In the invention II, considering that consumption of nitrogen in the substrates proceeds substantially in the first fermentation, the end point of the first fermentation is when consumption of nitrogen has proceeded at least partially to reach a predetermined level. The specific level of nitrogen consumption may be determined by the manufacturers intended for the alcoholic beverages to be produced.

The end point of the second fermentation is also when consumption of carbon in the fermented liquor has reached an intended predetermined level.

The fermented liquor obtained upon completion of the second fermentation is itself already an alcoholic beverage, but the liquor will be generally subjected to aging to provide a final product.

First fermentation

According to an embodiment of the invention II (embodiment IIA), the first fermentation is practiced in the presence of a yeast at a concentration of less than 0.4%, preferably less than 0.3%, more preferably less than 0.25%, based on the starting brew liquor. The % concentration as herein mentioned is based on dry microbial cell weight (g)/volume (ml). The yeast concentration as herein mentioned is a function of yeast cell weight (based on dry product) and the substrate solution volume for a given batch in the case of a batch-wise operation, but the substrate solution volume in the case of continuous operation means the substrate solution volume in the reactor.

The reaction conditions in the first fermentation according to the embodiment IIA may be any desired ones suitable for the purpose, provided that proliferation of the yeast employed at the above yeast concentration can be ensured, specifically, for example, at a temperature of 4° C. or higher (e.g. 10°-20° C.) and under aerobic conditions (no continuous aeration requied, if aeration is effected to a desired DO level before initiation of fermentation, as mentioned above). The fermentation in the embodiment IIA is permitted to proceed at a low yeast concentration in order to inhibit formation of diacetyls (particularly vicinal diketone precursors), but an excessively long fermentation may possibly give a vicinal diketone precursor content at an undesirably high level, particularly exceeding 1 ppm, even at a low yeast concentration. Accordingly, the fermentation time for the first fermentation in the embodiment IIA should be such that the vicinal diketone precursor content may not exceed 1 ppm.

First fermentation (bis)

In another embodiment of the present invention II (embodiment IIB), it is not required to practice the first fermentation so that the content of diacetyls (particularly vicinal diketone precursors) may not exceed 1 ppm since vicinal diketone precursors are converted into readily decomposable vicinal diketones by heat treatment before the second fermentation. The first fermentation may thus be practiced at a high yeast concentration.

Except that the first fermentation may be practiced at a high yeast concentration, the practicing conditions for the first fermentation in the embodiment IIB are not essentially different from those of the embodiment IIA.

Second fermentation

The second fermentation is such that no substantial proliferation of yeast takes place during the fermentation, and this is conducted in the presence of a highly concentrated yeast in the embodiment IIA.

Fermentation not substantially accompanied with proliferation of yeast means that the fermentation is practiced under anaerobic conditions (e.g. DO of 0.5 ppm or lower, preferably 0.1 ppm or lower) and/or under low temperature conditions of 4° C. or lower, preferably −1° C.−+1° C., as described above.

The high concentration of the yeast employed means that fermentation is carried out in the presence of a yeast at 0.4% or more based on the starting brew liquor. The % concentration as hereindefined means the same as defined above, and also the "starting brew liquor" in defining the % concentration means the substrate solution to be subjected to the second fermentation (namely one after the first fermentation).

A typical example in practicing fermentation in the presence of a high concentration yeast comprises using an immobilized yeast, as mentioned above, and the second fermentation in the embodiment IIA should preferably be practiced with the use of an immobilized yeast.

In the embodiment IIA, the reaction conditions in the second fermentation may be any desired ones suitable for the purpose, provided that proliferation of the yeast employed can be inhibited, specifically, for example, at a temperature of 4° C. or lower (preferably −1°−+1° C.), and/or DO of 0.5 ppm or lower (preferably 0.1 ppm or less). The time for contact between the yeast employed and the substrate solution may be such that the consumption of carbon in the fermented liquor may reach a desired level.

Second fermentation (bis)

In another embodiment of the invention II (embodiment IIB), it is not required to practice the second fermentation in the presence of a high concentration yeast since vicinal diketone precursors are converted into readily decomposable vicinal diketones by heat treatment before the second fermentation, and since the first fermentation can be practiced at high yeast concentration.

One specific feature of the second fermentation according to the embodiment IIB is that the substrate solution for the fermentation (namely one after the first fermentation) has been subjected to heating treatment. The heating treatment is ordinarily carried out, in view of the problem with respect to flavor, by maintaining the substrate solution at a temperature of about 60° to 100° C. within 40 minutes.

As the means for subjecting the substrate solution to such heating condition, any suitable ones for the purpose may be used. More specifically, for example, the substrate solution may be permitted to reside for a predetermined period of time in a heating tank having a spiral tube and/or a jacket for heating medium, or to pass through a spiral tube provided in a heating bath so that predetermined residence time may be obtained.

Except that the second fermentation can be practiced in the presence of a low concentration yeast, the conditions for practicing the second fermentation in the embodiment IIB are not essentially different from those of the embodiment IIA.

However, the second fermentation in the embodiment IIB should preferably be practiced according to the high yeast concentration method, particularly the method in the presence of a yeast at 0.4% or higher based on the starting brew liquor (% concentration and starting brew liquor are as defined above), particularly the method by use of an immobilized yeast.

Production of Alcoholic Beverages (III)

Basic fermentation step:

The method of the present invention (III) comprises, basically, subjecting a starting brew liquor to a first fermentation in a first fermentation zone (specifically a fermentation tank) in the presence of an immobilized yeast at a yeast concentration of 0.4% or higher and subsequently to a second fermentation in a second fermentation zone (specifically a fermentation tank) during which substantial proliferation of yeast takes place in the presence of yeast at a concentration of less than 0.4%.

The starting brew liquor contains substrates for a predetermined yeast, and it is generally a solution or a dispersion containing sugars as substrates. A typical example of such a starting brew liquor is malt wort, fruit juice, etc.

The yeast which produces products such as alcohol through metabolism of such substrates is also known, as exemplified by *Saccharomyces uvarum*, *Saccharomyces cerevisiae*, etc. These yeasts are generally facultative anaerobes.

The first fermentation and the second fermentation may be practiced by the use of the same species of yeast or different species of yeast.

The yeast can be free one such as the so-called slurry yeast in the second fermentation, but it must be an immobilized yeast in the first fermentation in order to carry out a high yeast concentration fermentation.

As mentioned above, it is known to use an immobilized yeast carried on or occluded in a hydrogel, and details of itself and use thereof are described in various textbooks and reviews as mentioned above.

The fermentation conditions and others are not essentially different from those known in the prior art except for necessary changes in practicing the present invention III.

The concentration of the immobilized yeast to be used in the first fermentation is 0.4% or more based on the starting brew liquor. Also, the first fermentation should preferably be carried out by passing the substrate solution through a reactor filled with an immobilized yeast.

The fermentation during which substantial proliferation of yeast takes place in the second fermentation refers to a fermentation such that the α-amino nitrogen is consumed to a desired level with proliferation of yeast going on. Accordingly, the second fermentation is carried out generally under aerobic conditions and at a temperature exceeding 4° C. However, if the fermented liquor obtained from the first fermentation is subjected to aeration before feeding to the second fermentation zone or the fermentation tank, no aeration in said zone or tank is required. Also, consumption of the α-amino nitrogen is generally conducted to the extent of consumption in the fermentation carried out in the fermentation at conventional level of yeast.

The second fermentation is practiced in the presence of a yeast of less than 0.4% based on the starting brew liquor, in order to inhibit formation of diacetyls in said fermentation.

The first fermentation and the second fermentation are carried out in respective fermentation zones. Specifically, and typically, fermentation is carried out separately by the use of respective fermentation tanks. Each fermentation tank may be any desired one suitable for the purpose, as clearly seen from the above description. One or both of the fermentations may be carried out by the use of a plurality of tanks connected in parallel or in series to each other. Also, if desired, provided that the both fermentation steps are practiced separately from each other, both fermentation steps can be carried out in a single and the same fermentation tank.

In the embodiment IIIB, when yeast is brought into the heating step, the fermented liquor can have an objectionable odor formed by heating yeast, and therefore heating should desirably be effected on the liquor substantially freed from entrainment of yeast used in the first fermentation by means of centrifugation, etc.

In the invention III, considering that consumption of nitrogen in the substrates (which affects the flavor of the alcoholic beverages obtained, as mentioned above) proceeds substantially in the second fermentation, the end point of the second fermentation is when consumption of nitrogen has proceeded at least partially to reach a predetermined level. The specific value of nitrogen consumption may be determined by the brewers intended for the alcoholic beverages to be produced.

The end point of the first fermentation, also considering that carbon is consumed also in the second fermentation, should be selected so that consumption of carbon in the fermented liquor after the second fermentation may reach an intended predetermined level. For example, in the case of beer, the end point of the first fermentation is ordinarily selected so that the apparent extract of the fermented liquor reaches 3°–7° P.

The fermented liquor obtained upon completion of the second fermentation is itself already an alcoholic beverage, but the liquor will be generally subjected to aging to provide a final product in view of the possibility that diacetyls can be produced to some extent at the second fermentation.

First fermentation

According to an embodiment of the present invention III (embodiment IIIA), the first fermentation is practiced in the presence of a yeast at a concentration of not less than 0.4% based on the starting brew liquor [this condition being the same in another embodiment (the embodiment IIIB)]. The % concentration as herein mentioned is based on dry microbial cell weight (g)/volume (ml). The yeast concentration as herein mentioned is a function of yeast cell weight (based on dry product) and the substrate solution volume for a given batch in the case of a batch-wise operation, but the substrate solution volume in the case of continuous operation means the substrate solution volume in the reactor.

The reaction conditions in the first fermentation according to the embodiment IIIA may be at a temperature of 4° C. or lower (preferably $-1°-+1°$ C.), and/or under anaerobic conditions (DO of 0.5 ppm or lower, preferably 0.1 ppm or less). If the first fermentation is carried out under these reaction conditions, the diacetyls in the fermented liquor obtained from the first fermentation will ordinarily be 0.1 ppm or less.

First fermentation (bis)

In another embodiment of the present invention III (embodiment IIIB), it is not required to practice the first fermentation so that formation of diacetyls (particularly vicinal diketone precursors) is suppressed (so that the content of diacetyls may become 0.1 ppm or less) since vicinal diketone precursors are converted into readily decomposable vicinal diketones by heat treatment before the second fermentation. The first fermentation may thus be practiced at a high temperature or under aerobic conditions. The "high temperature" means a temperature of 4° C. or higher (e.g. 10° to 20° C.) and "aerobic conditions" means DO of more than 0.5 ppm.

Except that the first fermentation can be practiced at a high temperature or under aerobic condition, the practicing conditions for the first fermentation in the embodiment IIIB are not essentially different from those of the embodiment IIIA. Thus, also in the embodiment IIIB, the first fermentation is the high concentration method with immobilized yeast.

Second fermentation

The second fermentation is such that substantial proliferation of yeast takes place during the fermentation.

Fermentation during which substantial proliferation of yeast takes place means that the fermentation is practiced under aerobic conditions and under high temperature condition of 4° C. or higher, preferably 10° to 20° C., as described above. It has also been mentioned hereinbefore to practice the second fermentation with the use of the yeast at a concentration of less than 0.4%, preferably less than 0.3%, more preferably less than 0.25%, based on the starting brew liquor in order to inhibit formation of diacetyls. The % concentration as herein defined means the same as defined above, and also the "starting brew liquor" in defining the % concentration means the substrate solution to be subjected to the second fermentation (namely after the first fermentation). However, even at a low yeast concentration less than 0.4%, if the fermentation time is excessively long, the diacetyls concentration in the resultant fermented liquor may exceed an undesirable level, particularly 1 ppm. Accordingly, the fermentation time in the second fermentation in the embodiment IIIA should be within the range such that the diacetyl concentration may not exceed 1 ppm.

The time for contact between the yeast employed and the substrate solution may be such that the consumption of nitrogen in the fermented liquor may reach a desired level within the above range.

Second fermentation (bis)

One specific feature of the second fermentation according to the embodiment IIIB is that the substrate solution for the fermentation (namely one after the first fermentation) has been subjected to heating treatment. The heating treatment is ordinarily carried out, in view of the problem with respect to flavor, by maintaining the substrate solution at a temperature of about 60° to 100° C. within 40 minutes.

As the means for subjecting the substrate solution to such heating conditions, any suitable ones for the purpose can be used. More specifically, for example, the substrate solution may be permitted to reside for a predetermined period of time in a heating tank having a spiral tube and/or a jacket for heating medium, or to pass through a spiral tube provided in a heating bath so that predetermined residence time may be obtained.

In the second fermentation, diacetyls may also formed to some slight extent and, considering that the product of the second fermentation may usually be further subjected to aging (in contact with yeast), the heating treatment may possibly be carried out also after the second fermentation.

Except that the second fermentation is practiced after the heating treatment, the conditions for practicing the second fermentation in the embodiment IIIB are not essentially different from those of the embodiment IIIA.

EXPERIMENTAL EXAMPLES

Example I-1 (Embodiment I)

A cylindrical column of 5000 ml volume ($\phi$ 8 cm × 100 cm) was packed with beer yeast (*Saccharomyces uvarum*), which had been imobilized with 1% calcium alginate to a content of 30% and formed in beads of 3 mm in diameter, at a packing percentage of the beads of 80% to provide a reactor. A malt wort prepared to an apparent extract of 11° P was subjected to reduced pressure to deoxygenate, and carbon dioxide was blown thereinto to place the wort under anaerobic condition with the dissolved oxygen of 0–0.1 ppm and then the wort was passed through the reactor at 8° C. at a flow rate of 100 to 200 cm³/hour. The fermented liquor at the outlet of the reactor was found to have an alcohol concentration of 3.2 to 3.8 W/W %, an apparent extract of 3.0° to 4.0° P, with the diacetyl concentration being lowered by 75 to 90%, as compared with the case under no anaerobic condition, and this state remained stable for 2 weeks.

Example I-2 (Embodiment I)

A cylindrical column of 5000 ml volume ($\phi$ 8 cm × 100 cm) was packed with beer yeast (*Saccharomyces uvarum*), which had been immobilized with 1% calcium alginate to a content of 30% and formed in beads of 3 mm in diameter, at a packing percentage of the beads of 80% to provide a reactor. A malt wort with dissolved oxygen of 0 to 0.05 ppm obtained by removing dissolved oxygen by respiration of the yeast added and removing anaerobically the yeast was passed through the reactor at 8° C. at a rate of 200 to 300 cm$^3$/hour while maintaining its state. The fermented liquor at the outlet of the reactor was found to have an alcohol concentration of 3.2 to 3.8 W/W %, an apparent extract of 2.5° to 3.5° P, with the diacetyl concentration being lowered by 90 to 96%, as compared with the case not under anaerobic condition, and this state remained stable for 3 weeks.

Example I-3 (Embodiment I)

Into a fermentor of 500 ml volume was charged strongly agglomerating beer yeast (*Saccharomyces uvarum*) to a concentration of 5 W/V per malt wort, and a malt wort prepared to an apparent extract of 11° P and made anaerobic by deoxygenation under vacuo followed by blowing of carbon dioxide to dissolved oxygen of 0 to 0.1 ppm was passed anaerobically at 20° C. at a dilution rate of 0.02 to 0.08/hour. The fermented liquor at the outlet of the fermentor was found to have an alcohol concentration of 3.0 to 3.8 W/W %, an apparent extract of 3.0° to 4.0° P, with the diacetyl concentration being lowered by 60 to 90%, as compared with the case not under anaerobic condition, and this state remained stable for 4 days.

Example I-4 (Embodiment I)

Into a cylindrical column of 400 ml volume ($\phi$ 5 cm×20 cm) was packed wine yeast (*Saccharomyces cerevisiae*), which had been immobilized with 1% calcium alginate to a content of 30% and formed in beads of 3 mm diameter, at a packing percentage of the beads of 80% to provide a reactor. Grape juice of an apparent extract of 22° to 23° P was deoxygenated in vacuo and carbon dioxide was blown thereinto to place the juice under anaerobic condition with the dissolved oxygen of 0 to 0.1 ppm, and the juice was then passed through the reactor at 20° C. at a flow rate of 20 to 40 cm$^3$/hr under anaerobic condition. The fermented liquor at the outlet of the reactor was found to have an alcohol concentration of 9 to 11 W/W %, an apparent extract of 4° to 5° P, with the diacetyl concentration being lowered by 90 to 96%, as compared with the case under no anaerobic condition, and this state remained stable for 2 weeks.

Example II-1 (Embodiment IIB)

Through a first tank of 4000 ml volume under the conditions of a temperature of 20° C., a stirring speed of 200 rpm and an aeration rate of 10 ml/min.liter, a malt wort prepared to an apparent extract of 11° P was passed at 20° C. at a rate of 300 ml/hour to carry out continuous fermentation with beer yeast (*Saccharomyces uvarum*) [concentration 0.2% (the definition of % concentration is as defined above)]. Next, the yeast was removed by centrifugation anaerobically from the fermented liquor coming out from the first tank and the fermented liquor was heated at 70° C. for 30 minutes and then cooled to 8° C., and passed through a second tank anaerobically at a rate of 300 ml/hour. As the second tank, use was made of a cylindrical column of 5000 ml volume packed with calcium alginate gel beads (3 mm in diameter), which beads were prepared by adding beer yeast (*Saccharomyces uvarum*) into an aqueous 1 W/V sodium alginate solution to be mixed therein to 16.5 W/V % in wet weight and by adding the mixture dropwise into an aqueous 0.05M calcium chloride solution, at a packing percentage of the beads of 60% [yeast concentration in the second tank 3.6% (the definition of % concentration is as defined above)].

The compositions of the fermented liquors from the first tank outlet and the second tank outlet became stabilized 3 days after initiation of fermentation, and the results as shown in Table II-1 were obtained over 2 weeks or longer.

As a comparative example, when a malt wort prepared to an apparent extract of 11° P (DO 8.0 ppm) was passed only through the second tank at 8° C. at 210 ml/hour, the fermented liquor obtained became stabilized 3 days after initiation of fermentation, and the results as shown in Table II-1 were obtained over 2 weeks or longer.

Example II-2 (Embodiment IIB)

When, in Example II-1, aeration was not practiced in the first tank but the wort fed was aerated with an amount of 30 ml/min.liter for 30 minutes before its feeding into the first tank, the compositions of the fermented liquors from the first tank outlet and the second tank outlet became, stabilized 3 days after initiation of fermentation, and the results as shown in Table II-1 were obtained over 2 weeks or longer.

Example II-3 (Embodiment IIB)

Through a first tank of 5000 ml volume under the conditions of a temperature of 13° C., a stirring speed of 500 rpm and an aeration rate of 20 ml/min.liter, a malt wort prepared to an apparent extract of 11° P was passed at 13° C. at a rate of 200 ml/hour to carry out continuous fermentation with beer yeast (*Saccharomyces uvarum*) [concentration 0.2% (the definition of % concentration is as defined above)]. Next, the yeast was removed by centrifugation anaerobically from the fermented liquor coming out from the first tank and the fermented liquor was heated at 75° C. for 25 minutes and then cooled to 8° C., and passed through a second tank at a rate of 200 ml/hour. The second tank was the same as employed in Example II-1.

The compositions of the fermented liquors from the first tank outlet and the second tank outlet became stabilized 3 days after initiation of fermentation, and the results as shown in Table II-1 were obtained over 2 weeks or longer.

Example II-4 (Embodiment IIA)

When, in Example II-3, the fermented liquor was passed through the second tank without the heating (at 75° C. for 25 minutes), the compositions of the fermented liquors from the first tank outlet and the second tank outlet became stabilized 3 days after initiation of fermentation, and the results as shown in Table II-1 were obtained over 2 weeks or longer.

Example II-5 (Embodiment IIA)

Through a first tank of 1000 ml volume under the conditions of a temperature of 13° C., a stirring speed of 150 rpm and an aeration rate of 40 ml/min.liter, a malt wort prepared to an apparent extract of 11° P was passed at 13° C. at a rate of 40 ml/hour to carry out continuous fermentation with beer yeast (*Saccharomyces uvarum*) [concentration 0.18% (the definition of % concentration is as defined above)]. Next, the yeast was removed by centrifugation anaerobically from the fermented liquor coming out from the first tank and the fermented liquor was cooled to 0.2° C., and passed through a second tank at a rate of 40 ml/hour. The fermented liquor flowing into the second tank had a DO of 4.0 ppm. The second tank was the same as employed in Example II-1.

The compositions of the fermented liquors from the first tank outlet and the second tank outlet became stabilized 3 days after initiation of fermentation, and the results as shown in Table II-1 were obtained over 2 weeks or longer.

Example II-6 (Embodiment IIA)

Through a first tank of 6400 ml volume under the conditions of a temperature of 8° C., a stirring speed of 300 rpm and an aeration rate of 10 ml/min.liter, a malt wort prepared to an apparent extract of 11° P was passed at 8° C. at a rate of 200 ml/hour to carry out continuous fermentation with beer yeast (*Saccharomyces uvarum*) [concentration 0.22% (the definition of % concentration is as defined above)]. Next, the yeast was removed by centrifugation anaerobically from the fermented liquor coming out from the first tank and the fermented liquor was passed through a second tank at 8° C. anaerobically at a rate of 200 ml/hour. The second tank was the same as employed in Example II-1.

The compositions of the fermented liquors from the first tank outlet and the second tank outlet became stabilized 3 days after initiation of fermentation, and the results as shown in Table II-1 were obtained over 2 weeks or longer.

Example II-7 (Embodiment IIA)

Through a first tank of 6000 ml volume under the conditions of a temperature of 20° C., a stirring speed of 200 rpm and an aeration rate of 10 ml/min.liter, a grape juice prepared to an apparent extract of 22° P was passed at 20° C. at a rate of 300 ml/hour to carry out continuous fermentation with wine yeast (*Saccharomyces cerevisiae*) [concentration 0.22% (the definition of % concentration is as defined above)]. Next, the yeast was removed by centrifugation anaerobically from the fermented liquor coming out from the first tank and the fermented liquor was passed through a second tank at 20° C. anaerobically at a rate of 300 ml/hour. As the second tank, use is made of a cylindrical column of 5000 ml volume packed with calcium alginate gel beads (3 mm in diameter), which beads were prepared by adding wine yeast (*Saccharomyces cerevisiae*) into an aqueous 1 W/V sodium alginate solution to be mixed therein to 16.5 W/V % in wet weight and by adding the mixture dropwise into an aqueous 0.05M calcium chloride solution, at a packing percentage of the beads of 60% [yeast concentration in the second tank 3.6% (the definition of % concentration is as defined above)].

The compositions of the fermented liquors from the first tank outlet and the second tank outlet became stabilized 3 days after initiation of fermentation, and the results as shown in Table II-1 were obtained over 2 weeks or longer.

As a comparative example, a grape juice prepared to an apparent extract of 22° P (DO 7.0 ppm) was passed only through the second tank at 20° C. at 280 ml/hour. The fermented liquor obtained became stabilized 3 days after initiation of fermentation, and the results as shown in Table II-1 were obtained over 2 weeks or longer.

Example II-8 (Embodiment IIB)

In Example II-1, strongly agglomerating beer yeast (*Saccharomyces uvarum*) was charged into a cylindrical column of 5000 ml volume, a second vessel, to a concentration of 1% (the definition of % concentration is as defined above), following otherwise the same conditions as in Example II-1, to carry out continuous fermentation.

The compositions of the fermented liquors from the first tank outlet and the second tank outlet became stabilized 3 days after initiation of fermentation, and the results as shown in Table II-1 were obtained over 2 weeks or longer.

Example II-9 (Embodiment IIB)

Through a first tank of 1000 ml volume under the conditions of a temperature of 20° C., a stirring speed of 100 rpm and an aeration rate of 10 ml/min.liter, a malt wort prepared to an apparent extract of 11° P was passed at 20° C. at a rate of 60 ml/hour to carry out continuous fermentation with beer yeast (*Saccharomyces uvarum*) [concentration 0.2% (the definition of % concentration is as defined above)]. Next, the yeast was removed by centrifugation anaerobically from the fermented liquor coming out from the first tank and the fermented liquor was heated at 70° C. for 30 minutes and then cooled to 8° C., and passed through a second tank of 400 ml volume anaerobically at a rate of 60 ml/hour to carry out fermentation anaerobically with beer yeast (*Saccharomyces uvarum*) [concentration 0.2% (the definition of % concentration is as defined above)].

The compositions of the fermented liquors from the first tank outlet and the second tank outlet became stabilized 3 days after initiation of fermentation, and the results as shown in Table II-1 were obtained over 2 weeks or longer.

The fermentation conditions in respective tanks in Examples II-1 through II-9 are shown in Table II-2.

TABLE II-1

| Example | Embodiment | Starting Brew Liquor | | | Fermented Liquor from the First Tank | | | | Fermented Liquor from the Second Tank | | | |
|---|---|---|---|---|---|---|---|---|---|---|---|---|
| | | Kind | Apparent Extract °P | $\alpha$-amino nitrogen mg/lit. | Alcohol W/W % | Apparent Extract °P | $\alpha$-amino nitrogen mg/lit. | Diacetyls mg/lit. | Alcohol W/W % | Apparent Extract °P | $\alpha$-amino nitrogen mg/lit. | Diacetyls mg/lit. |
| II-1 | IIB | malt wort | 11 | 180 | 1.0 | 9.0 | 65 | 0.3 | 3.2 | 3.5 | 54 | 0.1 |
| | Comp. Exam. | malt wort | 11 | 180 | | | | | 3.2 | 3.5 | 135 | 2.0 |
| II-2 | IIB | malt wort | 11 | 180 | 0.95 | 9.3 | 70 | 0.32 | 3.2 | 3.5 | 62 | 0.09 |
| II-3 | IIB | malt wort | 11 | 180 | 0.98 | 9.0 | 70 | 0.28 | 3.8 | 2.5 | 61 | 0.08 |
| II-4 | IIA | malt wort | 11 | 180 | 0.98 | 9.0 | 70 | 0.28 | 3.8 | 2.5 | 61 | 0.42 |
| II-5 | IIA | malt | 11 | 180 | 0.96 | 9.1 | 72 | 0.28 | 3.5 | 3.1 | 61 | 0.35 |

TABLE II-1-continued

| Example | Embodiment | Starting Brew Liquor Kind | Starting Brew Liquor Apparent Extract °P | Starting Brew Liquor α-amino nitrogen mg/lit. | Fermented Liquor from the First Tank Alcohol W/W % | Fermented Liquor from the First Tank Apparent Extract °P | Fermented Liquor from the First Tank α-amino nitrogen mg/lit. | Fermented Liquor from the First Tank Diacetyls mg/lit. | Fermented Liquor from the Second Tank Alcohol W/W % | Fermented Liquor from the Second Tank Apparent Extract °P | Fermented Liquor from the Second Tank α-amino nitrogen mg/lit. | Fermented Liquor from the Second Tank Diacetyls mg/lit. |
|---|---|---|---|---|---|---|---|---|---|---|---|---|
| II-6 | IIA | wort malt | 11 | 180 | 0.98 | 9.1 | 67 | 0.30 | 3.8 | 2.5 | 58 | 0.40 |
| II-7 | IIA | wort grape juice | 22 | | 1.3 | 18 | | 0.9 | 10 | 4.5 | | 1.0 |
| | Comp. Exam. | grape juice | 22 | | | | | | 10 | 4.5 | | 11 |
| II-8 | IIB | malt wort | 11 | 180 | 1.0 | 9.0 | 65 | 0.3 | 3.1 | 3.7 | 50 | 0.09 |
| II-9 | IIB | malt wort | 11 | 180 | 1.0 | 9.0 | 75 | 0.3 | 3.5 | 3.2 | 60 | 0.08 |

TABLE II-2

| | | Fermentation at the First Tank | | | | | | |
|---|---|---|---|---|---|---|---|---|
| Example | Embodiment | Volume ml | Feed rate ml/hr. | Temperature °C. | Aeration rate ml/min. lit. | Stirring speed r.p.m. | Yeast conc. % | Slurry or immobilized |
| II-1 | IIB | 4000 | 300 | 20 | 10 | 200 | 0.2 | Slurry |
| | Comparative Example | | | | | | | |
| II-2 | IIB | 4000 | 300 | 20 | 30* | 200 | 0.2 | " |
| II-3 | IIB | 5000 | 200 | 13 | 20 | 500 | 0.2 | " |
| II-4 | IIA | 5000 | 200 | 13 | 20 | 500 | 0.2 | " |
| II-5 | IIA | 1000 | 40 | 13 | 40 | 150 | 0.18 | " |
| II-6 | IIA | 6400 | 200 | 8 | 10 | 300 | 0.22 | " |
| II-7 | IIA | 6000 | 300 | 20 | 10 | 200 | 0.22 | " |
| | Comparative Example | | | | | | | |
| II-8 | IIB | 4000 | 300 | 20 | 10 | 200 | 0.2 | " |
| II-9 | IIB | 1000 | 60 | 20 | 10 | 100 | 0.2 | " |

*Preliminary aeration

TABLE II-2 (bis)

| | | | | Fermentation at the Second Tank | | | | | |
|---|---|---|---|---|---|---|---|---|---|
| Example | Embodiment | Yeast removal | Heating condition: Temperature °C., Time minute | Volume ml | Feed rate ml/hr. | Temperature °C. | Anaerobic or aerobic | Yeast conc. % | Slurry or immobilized |
| II-1 | IIB | Yes | 70° C., 30 min. | 5000 | 300 | 8 | anaerobic | 3.6 | Immobilized |
| | Comparative Example | | | 5000 | 210 | 8 | aerobic | 3.6 | " |
| II-2 | IIB | Yes | 70° C., 30 min. | 5000 | 300 | 8 | anaerobic | 3.6 | " |
| II-3 | IIB | Yes | 75° C., 25 min. | 5000 | 200 | 8 | anaerobic | 3.6 | " |
| II-4 | IIA | Yes | None | 5000 | 200 | 8 | anaerobic | 3.6 | " |
| II-5 | IIA | Yes | " | 5000 | 40 | 0.2 | aerobic | 3.6 | " |
| II-6 | IIA | Yes | " | 5000 | 200 | 8 | anaerobic | 3.6 | " |
| II-7 | IIA | Yes | " | 5000 | 300 | 20 | anaerobic | 3.6 | " |
| | Comparative Example | | | 5000 | 280 | 20 | aerobic | 3.6 | " |
| II-8 | IIB | Yes | 70° C., 30 min. | 5000 | 300 | 8 | anaerobic | 1 | Slurry |
| II-9 | IIB | Yes | 70° C., 30 min. | 4000 | 60 | 8 | anaerobic | 0.2 | " |

Example III-1 (Embodiment IIIB)

The first tank employed was prepared by packing a cylindrical column of 5000 ml volume with calcium alginate gel beads (3 mm in diameter), which beads were prepared by adding beer yeast (*Saccharomyces uvarum*) into an aqueous 1 W/V sodium alginate solution to be mixed therein to 16.5 W/V % in wet weight and by adding the mixture dropwise into an aqueous 0.05M calcium chloride solution, at a packing percentage of the beads of 60% [yeast concentration in the first tank 3.6% (the definition of % concentration is as defined above)], and a malt wort controlled to an apparent extract of 11° P (dissolved oxygen 8.0 ppm) was passed therethrough at 8° C. at a rate of 300 ml/hour. Next, the fermented liquor coming out from the first tank was heated at 70° C. for 30 minutes and then cooled to 20° C., and was passed through a second tank at a rate of 300 ml/hour. In the second tank, continuous fermentation was carried out with beer yeast (*Saccharomyces uvarum*) [concentration 0.2% (the definition of % concentration is as defined above)] under the conditions of a temperature of 20° C., a stirring speed of 200 r.p.m., an aeration rate of 10 ml/min.liter and a volume of 4000 ml.

The compositions of the fermented liquors from the first tank outlet and the second tank outlet became stabilized 3 days after initiation of fermentation, and the results as shown in Table III-1 were obtained over 2 weeks or longer.

As a comparative example, a malt wort prepared to an apparent extract of 11° P (DO 8.0 ppm) was passed only through the first tank at 8° C. at 210 ml/hour. The fermented liquor obtained became stabilized 3 days after initiation of fermentation, and the results as shown in Table III-1 were obtained over 2 weeks or longer.

Example III-2 (Embodiment IIIB)

When, in Example III-1, aeration was not practiced in the second tank and the fermented liquor coming out from the first tank was aerated with an amount of 30 ml/min.liter for 30 minutes before its feeding into the second tank, the compositions of the fermented liquors from the first tank outlet and the second tank outlet became stabilized 3 days after initiation of fermentation, and the results as shown in Table III-1 were obtained over 2 weeks or longer.

Example III-3 (Embodiment IIIB)

Through the same first tank as employed in Example III-1, a malt wort controlled to an apparent extract of 11° P (dissolved oxygen 8.0 ppm) was passed therethrough at 8° C. at a rate of 210 ml/hour. Next, the fermented liquor coming out from the first tank was heated at 75° C. for 20 minutes and then cooled to 13° C., and passed through a second tank at a rate of 210 ml/hour. In the second tank, continuous fermentation was carried out with beer yeast (*Saccharomyces uvarum*) [concentration 0.2% (the definition of % concentration is as defined above)] under the conditions of a temperature of 13° C., a stirring speed of 300 rpm, an aeration rate of 20 ml/min.liter and a volume of 5000 ml.

The compositions of the fermented liquors from the first tank outlet and the second tank outlet became stabilized 3 days after initiation of fermentation, and the results as shown in Table III-1 were obtained over 2 weeks or longer.

Example III-4 (Embodiment IIIA)

Through the same first tank as employed in Example III-1, a malt wort controlled to an apparent extract of 11° P (dissolved oxygen 8.0 ppm) was passed therethrough at 0.5° C. at a rate of 42 ml/hour. Next, the fermented liquor coming out from the first tank was set at 13° C., and passed through a second tank at a rate of 42 ml/hour. In the second tank, continuous fermentation was carried out with beer yeast (*Saccharomyces uvarum*) [concentration 0.25% (the definition of % concentration is as defined above)] under the conditions of a temperature of 13° C., a stirring speed of 200 rpm, an aeration rate of 40 ml/min.liter and a volume of 1000 ml.

The compositions of the fermented liquors from the first tank outlet and the second tank outlet became stabilized 3 days after initiation of fermentation, and the results as shown in Table III-1 were obtained over 2 weeks or longer.

Example III-5 (Embodiment IIIB)

The first tank employed was prepared by packing a cylindrical column of 5000 ml volume with calcium alginate gel beads (3 mm in diameter), which beads were prepared by adding wine yeast (*Saccharomyces cerevisiae*) to an aqueous 1 W/V sodium alginate solution to be mixed therein to 16.5 W/V % in wet weight and by adding the mixture dropwise to an aqueous 0.05M calcium chloride solution, at a packing percentage of the beads of 60% [yeast concentration in the first tank 3.6% (the definition of % concentration is as defined above)], and a grape juice controlled to an apparent extract of 22° P (dissolved oxygen 7.5 ppm) was passed therethrough at 20° C. at a rate of 300 ml/hour. Next, the fermented liquor coming out from the first tank was heated at 70° C. for 30 minutes and then cooled to 20° C., and permitted to pass through a second tank at a rate of 300 ml/hour. In the second tank, continuous fermentation was carried out with wine yeast (*Saccharomyces cerevisiae*) [concentration 0.22% (the definition of % concentration is as defined above)] under the conditions of a temperature of 20° C., a stirring speed of 200 rpm, an aeration rate of 10 ml/min.liter and a volume of 6000 ml.

The compositions of the fermented liquors from the first tank outlet and the second tank outlet became stabilized 3 days after initiation of fermentation, and the results as shown in Table III-1 were obtained over 2 weeks or longer.

As a comparative example, when a grape juice prepared to an apparent extract of 22° P (DO 7.5 ppm) was passed only through the first tank at 20° C. at 270 ml/hour, the fermented liquor obtained became stabilized 3 days after initiation of fermentation, and the results as shown in Table III-1 were obtained over 2 weeks or longer.

Example III-6 (Embodiment IIIA)

Through the same first tank as employed in Example III-1, a malt wort controlled to an apparent extract of 11° P (dissolved oxygen 0.1 ppm) was passed therethrough at 8° C. at a rate of 250 ml/hour. Next, the fermented liquor coming out from the first tank was set to 20° C., and permitted to pass through a second tank at a rate of 250 ml/hour. In the second tank, continuous fermentation was carried out with beer yeast (*Saccharomyces uvarum*) [concentration 0.15% (the definition of % concentration is as defined above)] under the conditions of a temperature of 20° C., a stirring speed of 250 rpm, an aeration rate of 20 ml/min.liter and a volume of 4000 ml.

The compositions of the fermented liquors from the first tank outlet and the second tank outlet became stabilized 3 days after initiation of fermentation, and the results as shown in Table III-1 were obtained over 2 weeks or longer.

The fermentation conditions in respective tanks in Examples III-1 through III-6 are shown in Table III-2.

TABLE III-1

| Example | Starting Brew Liquor | | | Fermented Liquor from the First Tank | | | | Fermented Liquor from the Second Tank | | | |
|---|---|---|---|---|---|---|---|---|---|---|---|
| | Kind | Apparent Extract °P | $\alpha$-amino nitrogen mg/lit. | Alcohol W/W % | Apparent Extract °P | $\alpha$-amino nitrogen mg/lit. | Diacetyls mg/lit. | Alcohol W/W % | Apparent Extract °P | $\alpha$-amino nitrogen mg/lit. | Diacetyls mg/lit. |
| III-1 | malt wort | 11 | 180 | 2.4 | 5.5 | 145 | 1.9 | 3.2 | 3.5 | 56 | 0.2 |
| Comp. | malt | 11 | 180 | 3.2 | 3.5 | 135 | 2.0 | | | | |

TABLE III-1-continued

| | | Starting Brew Liquor | | Fermented Liquor from the First Tank | | | | Fermented Liquor from the Second Tank | | | |
|---|---|---|---|---|---|---|---|---|---|---|---|
| Example | Kind | Apparent Extract °P | α-amino nitrogen mg/lit. | Alcohol W/W % | Apparent Extract °P | α-amino nitrogen mg/lit. | Diacetyls mg/lit. | Alcohol W/W % | Apparent Extract °P | α-amino nitrogen mg/lit. | Diacetyls mg/lit. |
| Exam. III-2 | wort malt | 11 | 180 | 2.4 | 5.5 | 145 | 1.9 | 3.2 | 3.5 | 64 | 0.18 |
| III-3 | wort malt | 11 | 180 | 3.2 | 3.5 | 135 | 2.0 | 3.8 | 2.5 | 60 | 0.15 |
| III-4 | wort malt | 11 | 180 | 2.3 | 5.7 | 165 | 0.08 | 3.5 | 3.1 | 64 | 0.28 |
| III-5 | wort grape juice | 22 | | 7.2 | 8.4 | | 12.5 | 10.0 | 4.5 | | 1.0 |
| Comp. Exam. | grape juice | 22 | | 10.0 | 4.5 | | 14.5 | | | | |
| III-6 | malt wort | 11 | 180 | 2.6 | 5.0 | 170 | 0.05 | 3.4 | 3.2 | 68 | 0.25 |

TABLE III-2

| | Condition of the First Fermentation | | | | | |
|---|---|---|---|---|---|---|
| Example | Volume ml | Feed Rate ml/hour | Temperature °C. | Inlet DO ppm | Yeast Conc. % | Slurry or Immobilized |
| III-1 | 5000 | 300 | 8 | 8.0 | 3.6 | immobilized |
| Comparative Example | 5000 | 210 | 8 | 8.0 | 3.6 | " |
| III-2 | 5000 | 300 | 8 | 8.0 | 3.6 | " |
| III-3 | 5000 | 210 | 8 | 8.0 | 3.6 | " |
| III-4 | 5000 | 42 | 0.5 | 8.0 | 3.6 | " |
| III-5 | 5000 | 300 | 20 | 7.5 | 3.6 | " |
| Comparative Example | 5000 | 270 | 20 | 7.5 | 3.6 | " |
| III-6 | 5000 | 250 | 8 | 0.1 | 3.6 | " |

TABLE III-2 (bis)

| | | Heating Condition | | Condition of the Second Fermentation | | | | | | |
|---|---|---|---|---|---|---|---|---|---|---|
| Example | Yeast Removal | Temp. °C. | Time min. | Volume ml | Feed Rate ml/hr. | Temp. °C. | Aeration Rate ml/min. lit. | Stirring Speed rpm | Yeast Conc. % | Slurry or Immobilized |
| III-1 | No | 70 | 30 | 4000 | 300 | 20 | 10 | 200 | 0.2 | Slurry |
| Comp. Exam. III-2 | No | 70 | 30 | 4000 | 300 | 20 | 30* | 200 | 0.2 | Slurry |
| III-3 | No | 75 | 20 | 5000 | 210 | 13 | 20 | 300 | 0.2 | " |
| III-4 | No | no heating | | 1000 | 42 | 13 | 40 | 200 | 0.25 | " |
| III-5 | No | 70 | 30 | 6000 | 300 | 20 | 10 | 200 | 0.22 | " |
| Comp. Exam. III-6 | No | no heating | | 4000 | 250 | 20 | 20 | 250 | 0.15 | Slurry |

*Preliminary aeration

What is claimed is:

1. A process for producing alcoholic beverages, comprising subjecting a starting brew liquor to a first fermentation under aerobic conditions, in a first fermentation zone, during which substantial proliferation of a yeast takes place, and subsequently to a second fermentation, in a second fermentation zone, during which no substantial proliferation of a yeast takes place in the substantial absence of the yeast employed in the first fermentation entrained thereto, said first fermentation being practiced in the presence of a yeast at a concentration less than 0.4% for a period of time such that vicinal diketone precursor content in a first fermented liquor product of said first fermentation does not exceed 1 ppm and consumption of α-amino nitrogen reaches a predetermined level, and said second fermentation being practiced in the presence of an immobilized yeast at a concentration not less than 0.4% for a period of time such that consumption of carbon reaches a predetermined level, the above % concentration being based on dry yeast cell weight per volume of starting brew liquor (w/v in g/ml).

2. A process according to claim 1, wherein the second fermentation is practiced at a temperature of 4° C. of less.

3. A process according to claim 1, wherein the second fermentation is practiced under anaerobic conditions.

4. A process according to claim 1, wherein the starting brew liquor is malt wort or fruit juice.

5. A process for producing alcoholic beverages, comprising subjecting a starting brew liquor to a first fermentation under aerobic conditions, in a first fermentation zone, during which substantial proliferation of a yeast takes place, for a period of time so that consumption of α-amino nitrogen reaches a predetermined level; and subsequently to a second fermentation, in a second fermentation zone, during which no substantial proliferation of a yeast takes place, for a period of time such that consumption of carbon reaches a predetermined level, said second fermentation being practiced with a yeast present at a concentration of at least 0.4% based on dry cell weight per volume of starting brew liquor (w/v in g/ml), said yeast being immobilized within a hydrogel, the fermented liquor obtained from the first fermentation being heated prior to the second fermentation to a temperature of about 60° to about 100° C. for a period of time of up to about 40 minutes, whereby vicinal diketone precursors are converted into readily decomposable vicinal diketones.

6. A process according to claim 5, wherein the first fermentation is practiced in the presence of a yeast at a concentration not less than 0.4% based on dry yeast cell weight per volume of starting brew liquor (w/v in g/ml).

7. A process according to claim 5, wherein the second fermentation is practiced at a temperature of 4° C. or less.

8. A process according to claim 5, wherein the second fermentation is practiced under anaerobic conditions.

9. A process according to claim 5, wherein the starting brew liquor is malt wort or fruit juice.

10. A process for producing alcoholic beverages, comprising subjecting a starting brew liquor to a first fermentation, in a first fermentation zone, for a period of time so that consumption of carbon after a second fermentation reaches a predetermined level, during which first fermentation no substantial proliferation of a yeast takes place, and subsequently to the second fermentation, in a second fermentation zone, during which substantial proliferation of a yeast takes place, said first fermentation being practiced in the presence of an immobilized yeast at a concentration not less than 0.4% and also at a temperature of 4° C. or less, under anaerobic conditions or both, and said second fermentation being practiced in the presence of a yeast at a concentration less than 0.4% under aerobic conditions for a period of time such that diacetyl concentration in a fermented liquor product of said fermentations does not exceed 1 ppm and consumption of $\alpha$-amino nitrogen reaches a predetermined level, said concentrations of yeast being based on dry yeast cell weight per volume of starting brew liquor (w/v in g/ml).

11. A process according to claim 12, wherein the starting brew liquor is malt wort or fruit juice.

12. A process for producing alcoholic beverages, comprising subjecting a starting brew liquor to a yeast at first fermentation in a first fermentation zone, subsequently to a second fermentation under aerobic conditions, in a second fermentation zone, during which substantial proliferation of a yeast takes place, said first fermentation being practiced in the presence of an immobilized yeast a concentration not less than 0.4% and for a period of time such that consumption of carbon after the second fermentation may reach a predetermined level, and the fermented liquor obtained from the first fermentation being heated prior to the second fermentation to a temperature of about 60° to about 100° C. for a period of time of up to about 40 minutes, whereby vicinal diketone precursors are converted into readily decomposable vicinal diketones, and said second fermentation being practiced in the presence of a yeast at a concentration less than 0.4% under aerobic conditions for a period of time such that diacetyl concentration in a fermented liquor product of said fermentations does not exceed 1 ppm and consumption of $\alpha$ amino nitrogen reaches a predetermined level, said concentrations of yeast being based on dry yeast cell weight per volume of starting brew liquor.

13. A process according to claim 12, wherein the heating is conducted under the condition that substantial entrainment of the yeast employed in the first fermentation thereto is avoided.

14. A process according to claim 10, wherein the starting brew liquor is malt wort or fruit juice.

* * * * *